Dec. 27, 1927.
C. R. BOGGS
1,654,508
FLEXIBLE CABLE
Filed Feb. 11, 1926
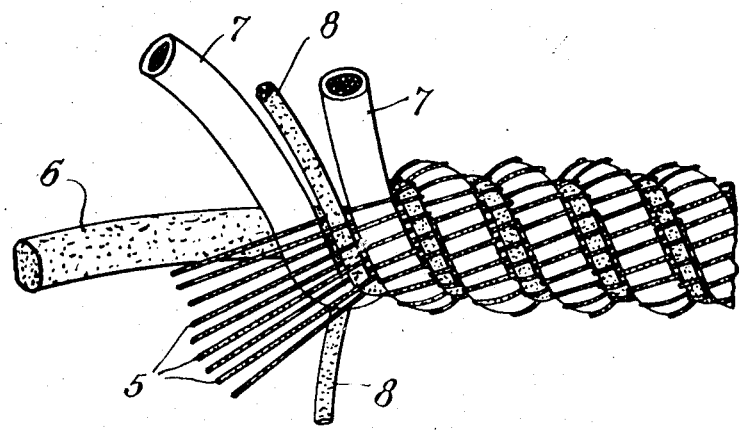
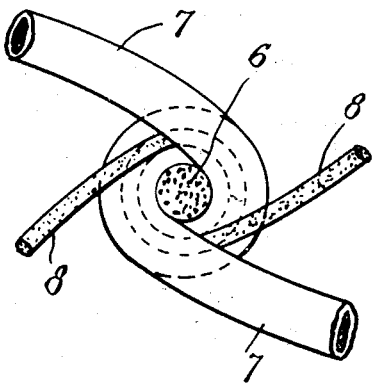
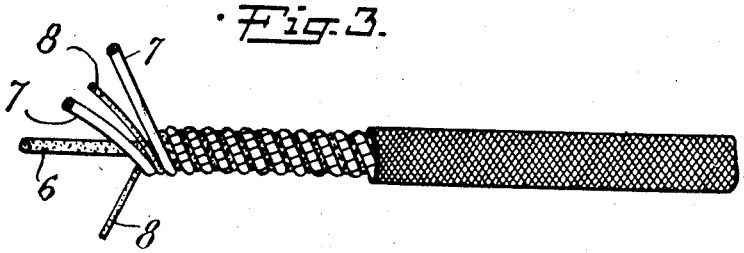
INVENTOR
*Charles R. Boggs*
BY
*Pennie, Davis, Marvin & Edmonds*
ATTORNEYS Patented Dec. 27, 1927.

1,654,508

UNITED STATES PATENT OFFICE.

CHARLES R. BOGGS, OF WABAN, MASSACHUSETTS, ASSIGNOR TO SIMPLEX WIRE AND CABLE COMPANY, OF BOSTON, MASSACHUSETTS, A CORPORATION OF MASSACHUSETTS.

FLEXIBLE CABLE.

Application filed February 11, 1926. Serial No. 87,493.

My invention relates to improvements in flexible electrical cables, and has, as one of its objects, the provision of a flexible cable of improved durability. The improved cable of my invention comprises one or more helically arranged conducting elements with non-conducting elements woven therethrough. The helical conducting elements advantageously constitute continuous woof elements in a woven tube adapted to resist tension along the axis of the helix. In addition to the conducting elements, non-conducting woof elements may be included and these may be arranged to space the conducting elements. A flexible core element may also be arranged within the woven tube.

The improved cable of my invention will withstand continued flexing and twisting to a much greater extent than cables of usual construction, for example cables formed by twisting a pair of conductors together and then braiding over the twisted pair. The useful life of such cables is usually terminated by breaking of the conducting elements, usually of copper, due to continued flexing and twisting or to "kinking". By arranging the conducting elements helically, the conducting elements themselves are not subjected to as sharp bends when the cable is flexed or twisted, and any tendency to "kink" is minimized. At the same time, in the cable of the present invention, the conducting elements are maintained in proper relation by the non-conducting elements woven therethrough while these non-conducting elements prevent undue stretching of the cable and give the cable tensile strength to withstand the strains of use or abuse.

I will further describe my invention by reference to the accompanying drawings, but it will be understood that this more detailed description and illustration is intended as an exemplification of the invention and that the invention is not limited thereto. In the accompanying drawings, Figs. 1 and 2 diagrammatically represent the construction of a cable embodying my invention; Fig. 1 being in general a side view of the cable and Fig. 2 a section through the axis of the cable. Figs. 1 and 2 are intended to show the arrangement and relation of the elements of the cable rather than a finished cable, for example the elements 5 in an actual cable may be of sufficient size and number completely to cover the conducting elements but in order to show the interior construction of the cable these elements are shown in skeleton fashion in Fig. 1 and are omitted in Fig. 2. Fig. 3 is intended more closely to represent an actual cable construction, but here also the illustration is necessarily of a diagrammatic nature.

Referring to Figs. 1 and 2, the cable is made up of a core element 6 and conducting elements 7 helically arranged about this core element with non-conducting elements 5 and spacing elements 8 also helically arranged about the core element. The non-conducting elements 5 are inter-woven with the conducting elements 7 and the spacing elements 8 and extend longitudinally of the cable in a helix which has a pitch longer than the pitch of the conducting elements 7 and the spacing elements 8. The core element 6, the spacing elements 8, and the elements 5 may be of cotton or asbestos or other suitable material. Asbestos is employed, for example, where the cable is to be subjected to high temperatures. The conducting elements may be of copper and may or may not be individually insulated. The conducting elements shown comprise stranded copper wires which are rubber covered. In place of rubber covered wire, asbestos covered wire may be employed, or rubber covered wires also individually covered with asbestos may be used. Where rubber covered wires without additional covering are used in applications where it is desirable to afford the rubber insulation additional protection, a sufficient number of warp elements 5 of sufficient size are employed completely to cover and enclose the rubber covered conducting elements in the woven cable, but if this additional protection is unnecessary warp elements sufficient in number and size only to maintain the conducting elements in proper relation and to give the cable the requisite tensile strength may be used. In either construction, additional protection may be afforded rubber covered wire or wire otherwise insulated by further enclosing the insulated wires individually in a covering adapted to give this protection, for example of asbestos to resist heat. The woven cable may be covered by a woven or braided jacket, as illustrated in Fig. 3.

The improved cable of my invention can readily be fabricated on a circular loom by putting the conductors to be formed into the cable into alternate shuttles of the loom and by employing suitable fibrous material such as cotton or asbestos for the warp ends.

In the improved cable of my invention, as will be apparent by reference to the drawings, the conducting elements constitute continuous helical woof elements through which the non-conducting warp elements are woven to form a tube-like structure. The central core element illustrated may be used to assist in supporting the tube or it may be omitted. The conducting elements are maintained in proper relation in this tube to permit of a maximum of flexure and twisting of the composite cable with but a minimum of bending of the conductor itself, and this proper relation is maintained during flexure and twisting of the cable. The warp elements woven through the conducting elements are arranged to offer a minimum of resistance to flexure while they nevertheless give the composite cable the requisite tensile strength to prevent the helically arranged conducting elements from being pulled apart. The composite cable may include one, two or more conducting elements. The additional non-conducting woof elements illustrated may in some cases be omitted, but where they are employed they impart additional flexibility to the composite cable as well as acting to space the conducting elements.

One of the particular advantages of the cable of my invention is that it can be made of good flexibility and at the same time of high current carrying capacity without sacrifice of its advantages with reference to durability. The usual domestic electric iron, for example, requires about 500 watts or more, and conductors adapted to carry such loads satisfactorily are necessarily fairly heavy. In the interest of easy handling, cables for supplying power to such irons should be as flexible as possible. The improved cable of this invention is particularly advantageous for such applications. Moreover, in domestic service generally, flexible cables are subjected to severe usage as care of the cable if it is practiced at all is made very much subordinate to the purposes of the particular device in connection with which the cable is used, and this makes my improved cable of special value for such purposes. Cables embodying my invention may, however, be made of either smaller or greater current carrying capacity. For example, cables embodying my invention and of much larger current carrying capacity may be used with advantage for supplying electrical power to portable or movable industrial machinery.

I claim:

1. A flexible cable comprising a helically arranged conducting element and helically arranged non-conducting elements associated therewith and holding the conducting element in helical arrangement, the pitch of the helices of the non-conducting elements being at least twice as great as the pitch of the helix of the conducting element.

2. A flexible cable comprising a helically arranged conducting element and helically arranged non-conducting elements associated therewith and holding the conducting element in helical arrangement, the direction of the helix of the conducting element being approximately transverse of the cable and the direction of the helices of the non-conducting elements being approximately longitudinal of the cable.

In testimony whereof I affix my signature.

CHARLES R. BOGGS.